US007497795B2

(12) United States Patent
Tohara et al.

(10) Patent No.: US 7,497,795 B2
(45) Date of Patent: Mar. 3, 2009

(54) SILENT CHAIN

(75) Inventors: Takashi Tohara, Osaka (JP); Akira Hirai, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 207 days.

(21) Appl. No.: 11/247,624

(22) Filed: Oct. 11, 2005

(65) Prior Publication Data

US 2006/0105872 A1 May 18, 2006

(30) Foreign Application Priority Data

Nov. 17, 2004 (JP) ............................. 2004-333240

(51) Int. Cl.
*F16G 13/04* (2006.01)
(52) U.S. Cl. .................................... 474/212
(58) Field of Classification Search ................ 474/206, 474/208, 212, 213, 218, 219, 220, 221, 223
See application file for complete search history.

(56) References Cited

U.S. PATENT DOCUMENTS

| 1,270,460 | A | * | 6/1918 | Taylor ......................... 474/157 |
| 4,463,550 | A | | 8/1984 | Avramidis |
| 5,562,557 | A | * | 10/1996 | Ledvina et al. ............... 474/84 |
| 5,700,217 | A | | 12/1997 | Wakabayashi |
| 5,758,484 | A | * | 6/1998 | Ledvina et al. .................. 59/5 |
| 6,393,820 | B1 | * | 5/2002 | Varnam et al. .................. 59/78 |
| 6,485,385 | B2 | | 11/2002 | Shimaya |
| 6,589,127 | B1 | | 7/2003 | Horie et al. |
| 6,733,410 | B2 | | 5/2004 | Saito |
| 6,743,134 | B2 | | 6/2004 | Okabe et al. |
| 2003/0195074 | A1 | | 10/2003 | Kaga et al. |
| 2005/0049097 | A1 | * | 3/2005 | Butterfield .................. 474/206 |

FOREIGN PATENT DOCUMENTS

| EP | 1 510 727 A2 | 3/2005 |
| EP | 1 510 727 A3 | 3/2005 |
| JP | 49 15846 | 2/1974 |
| JP | 60081538 A * | 5/1985 |
| JP | 7-151192 | 6/1995 |
| JP | 2001-108022 | 4/2001 |
| JP | 2002-130385 | 5/2002 |
| JP | 2002-266949 | 9/2002 |
| JP | 2003-301888 | 10/2003 |
| JP | 2004-183872 | 7/2004 |
| JP | 2005-351398 | 12/2005 |

* cited by examiner

*Primary Examiner*—Vicky A Johnson
(74) *Attorney, Agent, or Firm*—Howson & Howson LLP

(57) ABSTRACT

In an endless silent chain composed of alternating guide link rows and joint link rows connected by connecting pins, each guide link row is composed of a stack of three, centrally located, link plates and two outer guide plates, and each joint link row is composed of two pairs of link plates in abutting, side-by-side relationship. The pairs of link plates of the joint link rows extend into the spaces between the guide plates and the centrally located stack of each of two adjacent guide link rows.

2 Claims, 6 Drawing Sheets

SILENT CHAIN

FIELD OF THE INVENTION

This invention relates to silent chains used to transmit rotation from a driving sprocket to one or more driven sprockets, and more specifically to the suppression of wear elongation in silent chains.

BACKGROUND OF THE INVENTION

In a typical silent chain, a number of inner link plates, each having a pair of teeth and a pair of pin holes, are arranged in interleaved relationship in alternate "guide" link rows and non-guide link or "joint" link rows, extending widthwise of the chain. The guide link rows have guide plates at both ends, so that guide plates are provided along both sides of the chain. The alternate guide link rows and joint rows are connected articulably by connecting pins to form an endless loop. Typical silent chains of the type referred to above are shown and described in U.S. Patent Application Publication 2003/0195074 and U.S. Pat. No. 6,733,410.

FIGS. 2(A) and 2(B) show an example of a conventional silent chain 21. Similarly shaped inner link plates 24a and 24b constitute the inner link plates of guide link rows GL, which have guide plates 26 at their outer ends. The plates of the guide link rows GL are interleaved with link plates 25a and 25b of joint link rows JL. As shown in FIG. 2(B), each link plate has a pair of teeth 22 and a pair of pin holes 23. The guide plates 26 do not have teeth. The interleaved rows Gl and JL are connected by connecting pins 27, which fit into pin holes 28 of the guide plates 26 so that the pins are fixed to the guide plates. However, the pins fit into the pin holes 23 of these inner link plates 24a, 24b, 25a and 25b with a clearance.

Since the inner link plates are arranged in alternate interleaving rows, when a joint link row has a number n of link plates (four in the example shown), the number of link plates plus the number of guide plates in a guide link row is n+1 in the plates (inner link plates 25a and 25b) arranged in the non-guide link row and a total number of n+1 (five in the example shown).

When a longitudinal tensile load F is exerted on the chain during operation, as shown in FIG. 3, the load is divided among the inner link plates and the guide plates. However, since the number of plates (26, 24a, 24b, 24a, 26) in the guide link row GL is different from the number of plates (25a, 25b, 25b, 25a) in the joint link row JL, the loads applied to the respective plates become unbalanced.

Since connecting pins 27 are fixed in pin holes of the guide plates 26 at the ends of the guide link rows GL, and fit into pin holes 23 of the inner link plates (24a, 24b, 25a, 25b), when a tensile load F is exerted, the connecting pins 27 are bent, and the guide plates 26 are flexed as shown in FIG. 3. As a result, stress is not applied to all the inner link plates uniformly. Instead, stress is concentrated on specific inner link plates, namely plates 25a, which are adjacent the guide plates 26 and positioned at the outermost ends of the joint link rows JL, and a relatively low stress is applied to the intermediate link plates 25b in the joint rows.

The bending of the link plates also causes a high load to be applied to the inner link plates 24b, which are central link plates in the guide link rows GL. However, a relatively low load is applied to the inner link plates 24a, which are positioned near the guide plates 26.

The bending of the connecting pins thus results in unbalanced tensile loads on the link plates, and the stress balance is made even worse because the guide link rows and the joint rows have different numbers of plates.

The high load applied to certain link plates, especially link plates 25a, results in excess surface pressure acting on the inner circumferential surfaces of the pin holes 23 in these link plates, and on the outer circumferential surfaces of the connecting pins 27. Consequently both the inner surfaces of the pin holes and the outer surfaces of the connecting pins tend to wear rapidly, causing chain elongation.

Since the chain is composed of interleaved plates arranged alternately in the direction of the width of the chain, if each guide link row GL is composed of five plates (26, 24a, 24b, 24a, 26) and each joint link row JL is composed of four plates (25a, 25b, 25b, 25a) the plates contact one another at eight locations across the width of the chain, giving rise to a significant friction loss as the chain articulate when moving around sprockets.

In use, portions of outermost plates 25a of the joint link rows JL tend to fracture, and the measured wear of link plates 25a is significantly greater than the wear of the intermediate link plates 25b.

Accordingly, an object of this invention is to overcome the above-mentioned problems encountered in conventional silent chains. More specifically, an objects of the invention is to provide a silent chain in which, when a tensile load is exerted in the longitudinal direction of the chain, stresses applied to the respective inner link plates of the chain are made as uniform as possible, the high degree of wear in the pin holes of specific link plates and of the portions of the connecting pins in those pin holes, is suppressed, chain wear elongation is reduced, and link plate surface wear, caused by movement of the link plates against one another, is decreased.

SUMMARY OF THE INVENTION

In the silent chain according to the invention, a number of inner link plates, each having a pair of teeth and a pair of pin holes, are respectively arranged in guide link rows and joint link rows with guide plates arranged on both outermost sides of each guide link row. The guide link rows and the joint link rows are arranged alternately in an endless loop, and connected to one another by connecting pins. In each guide link row, a plurality of inner link plates are stacked together and arranged in a central stack at an intermediate location widthwise of the chain. In each joint row, first and second stacks of inner link plates, each stack consisting of a plurality of inner link plates, are disposed in widthwise, spaced relationship to each other. The first stack of inner link plates of each joint row extends between the central stack of one adjacent guide link row and one of the guide plates thereof, and between the central stack of another adjacent guide link row and one of the guide plates thereof. The second stack of inner link plates of each joint row similarly extends between the central stack of the one adjacent guide link row and the other one of the guide plates thereof, and between the central stack of said another adjacent guide link row and the other one of the guide plates thereof.

Stress applied to the inner link plate positioned on an outermost side of a joint link row is decreased, and, at the same time, flexure of the guide plate and the connecting pin is suppressed. As a result, stresses are more uniformly distributed to the centrally located inner link plates of the guide link row, so that the balance of stresses exerted on all the inner link plates of the guide link row and the joint link row is improved.

Furthermore, because flexure of the guide plate and the connecting pin is suppressed, limited area contact between the connecting pins and the pin holes of the outermost link plates of the joint link rows is suppressed, reducing wear at that location. As a result, wear elongation of the chain is reduced, and the problems of noise and tooth jumping due to wear elongation of the chain can be prevented.

Furthermore, because the inner link plates are stacked in groups, the total area of sliding contact between the faces of the plates is significantly reduces, and friction losses are consequently also reduced.

DETAILED DESCRIPTION OF THE PREFERRED EMBODIMENTS

Figure 1:
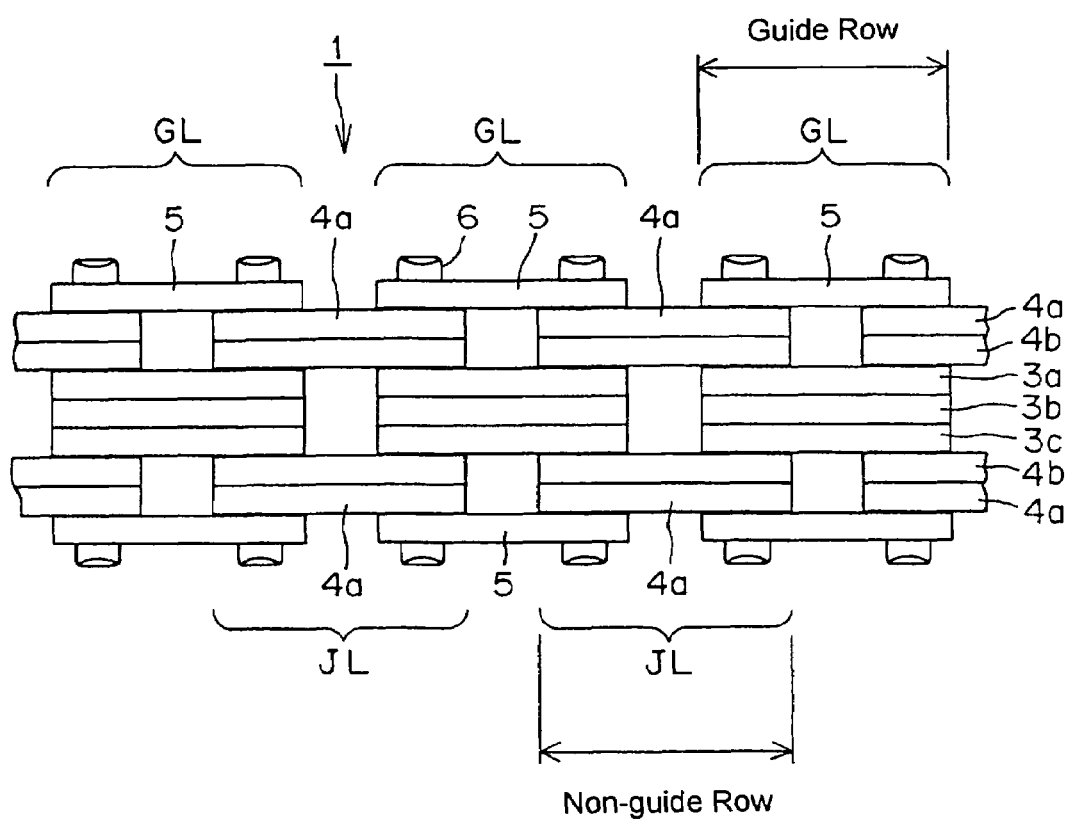
FIG. 1 is a plan view showing a part of a silent chain according to the invention.

In the silent chain 1, shown in FIG. 1 inner link plates 3a, 3b and 3c, and a pair of guide plates 5, form guide link rows GL, and two sets of link plates 4a and 4b form each joint link row (or "non-guide" row) JL. The plates are connected by connecting pins 6.

Each of the inner link plates 3a, 3b, 3c, 4a, 4b has a pair of teeth (not shown), and a pair of pin holes (not shown), as in a conventional link plate. The thicknesses of all of the inner link plates 3a, 3b, 3c, 4a, 4b are preferably the same.

In each guide link row GL, the three inner link plates 3a, 3b and 3c are stacked together, with plate 3b being located at the center of the chain in the widthwise direction. Guide plates 5, which have no teeth, are arranged on both outermost sides of each guide link row GL.

In each joint link row JL a pair of inner link plates 4a and 4b, which are stacked against each other, is disposed between a plate 3a and a guide plate 5 of an adjacent guide link row, and another similar pair of inner link plates 4a and 4b is disposed between a plate 3c and the other guide plate 5 of the adjacent guide link row.

The connecting pins 6 extend through pin holes of the inner link plates 3a, 3b, 3c, 4a and 4b with clearances, but the ends of the connecting pins 6 are secured in the pin holes of the guide plates 5, by press-fitting, caulking or the like. The silent chain 1 may be used to transmit rotation from a driving sprocket to one or more driven sprockets.

Figure 2:
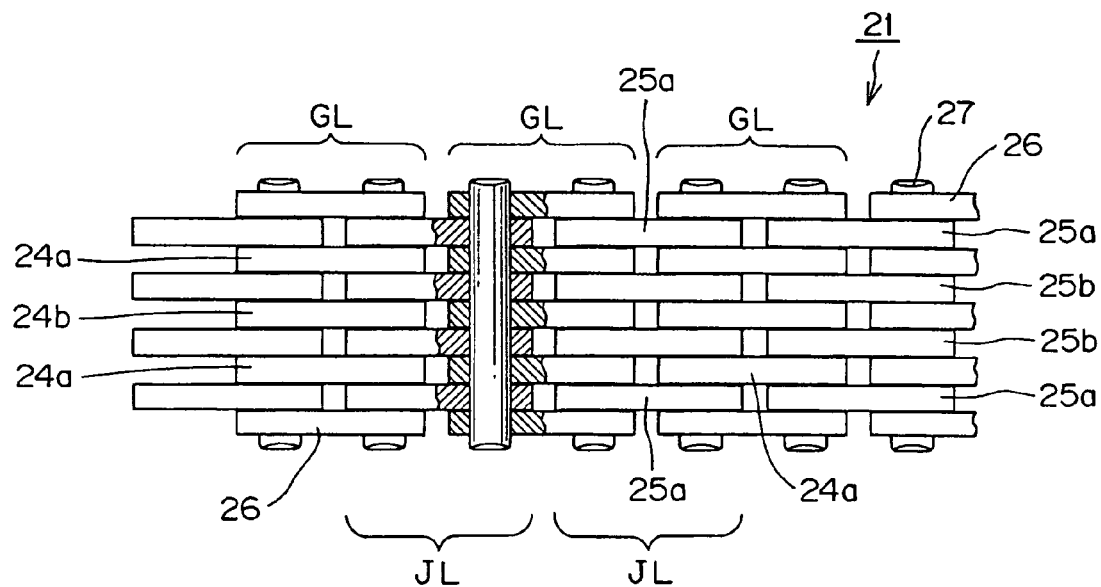
FIGS. 2(A) and 2(B) are respectively a plan view and a side elevational view of a conventional silent chain.
Figure 2:
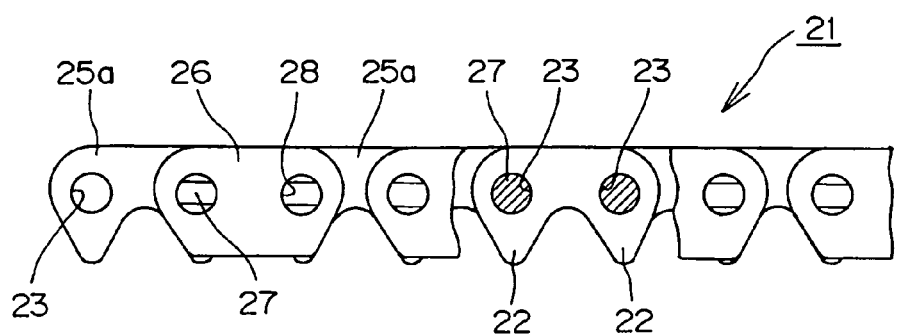
Figure 3:
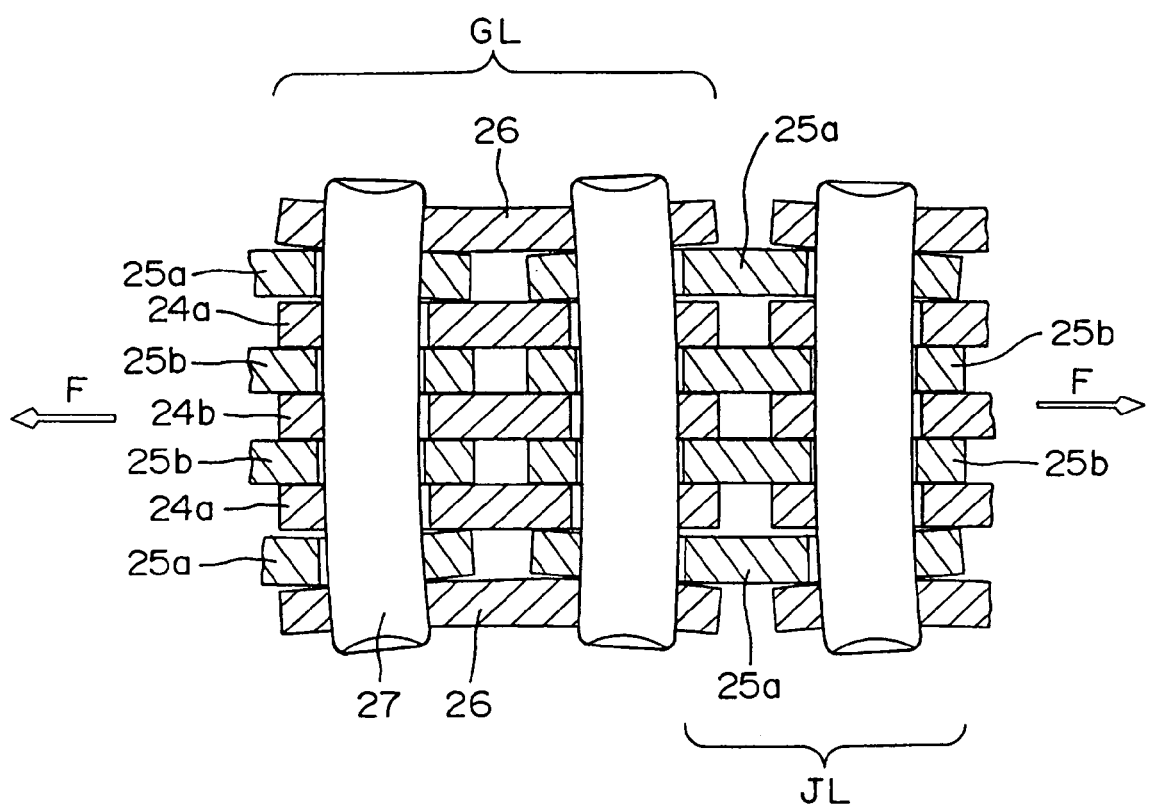
FIG. 3 is a schematic sectional view of a portion of a conventional silent chain, illustrating the conditions that occur when a tensile load is exerted on the chain.
Figure 4:
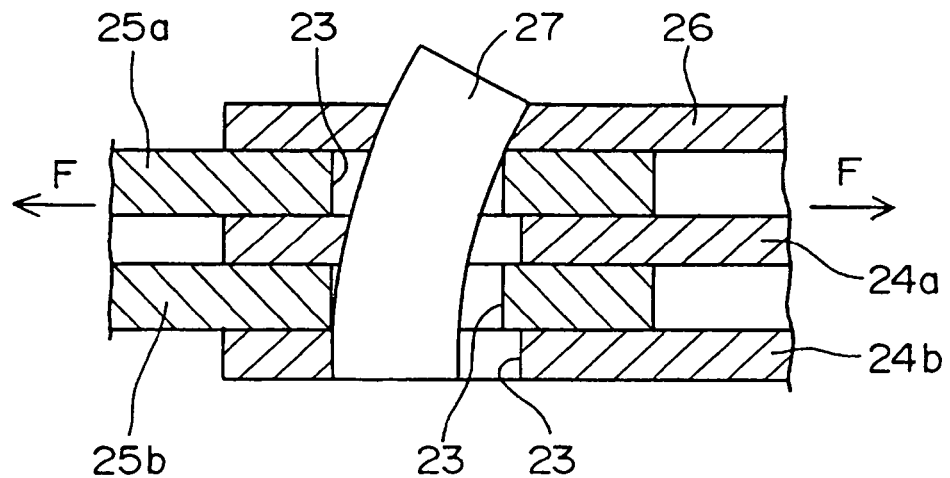
FIGS. 4(A) and 4(B) are schematic sectional views showing the deformation of connecting pins respectively in a conventional silent chain, and in a silent chain according to the invention.
Figure 4:
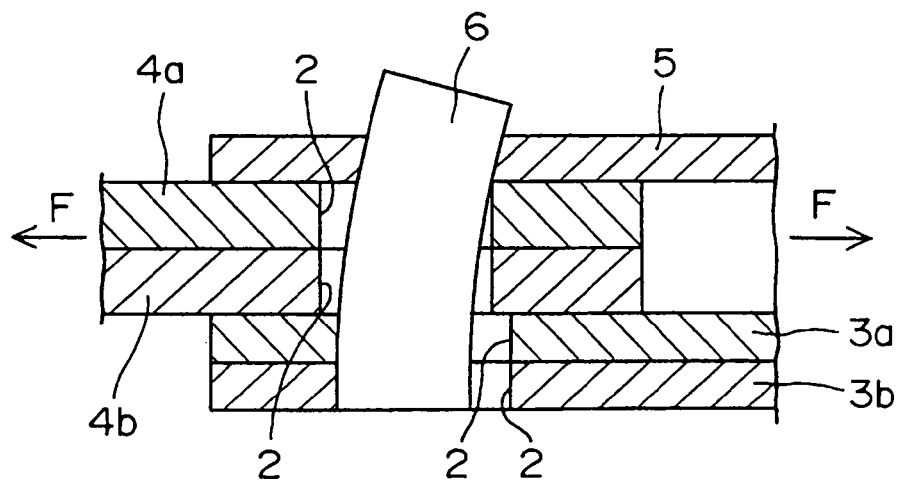
Figure 6:
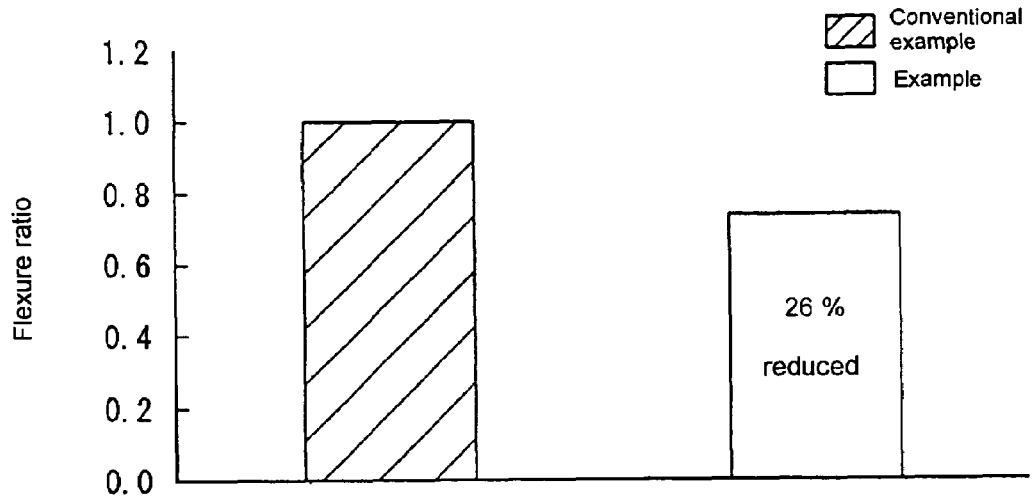
FIG. 6 is a graph showing the results of comparative tests on the flexure of connecting pins in a conventional chain and a chain according to the invention.

Here, the advantages of the silent chain according to the invention over the conventional silent chain 21 of FIG. 2(A) can be appreciated by reference to the schematic views in FIGS. 4(A) and 4(B), which respectively show the deformation of a connecting pin a tensile load F is applied to a conventional silent chain and to the silent chain of the invention. As can be seen from FIGS. 4(A) and 4(B), the connecting pin 6 in the chain according to the invention (FIG. 4(B)) exhibits a smaller amount of flexure compared with the flexure the connecting pin 27 in the conventional chain (FIG. 4(A)). The results flexure comparisons for the connecting pins are shown in FIG. 6, in which it is seen that the flexure ratio for the example according to the invention is 26% below the flexure ratio for the conventional example.

Wear deformation of the pin holes of the outermost inner link plates of the joint link rows JL of a chin occur when a tensile load F is applied to the chain. The wear deformations of the outermost inner link plates in the joint link rows of conventional chain, and in the joint link rows of a chain according to the invention, are depicted respectively in FIGS. 5(A) and 5(B). As noted above, the pin 6 in the chain according to the invention exhibits a smaller amount of flexure compared to that of the connecting pin 27 of a conventional chain, when the chain is operated under a tensile load F. Because the flexure of pin 6 is less than that of pin 27, the pin hole 2 of the inner link plate 4a of the silent chain according to the invention exhibits a smaller amount of wear compared to that of pin hole 23 in the inner link plate 25a of the conventional silent chain. As a result, the silent chain according to the invention exhibits reduced wear elongation compared with the wear elongation of the conventional silent chain.

Figure 7:
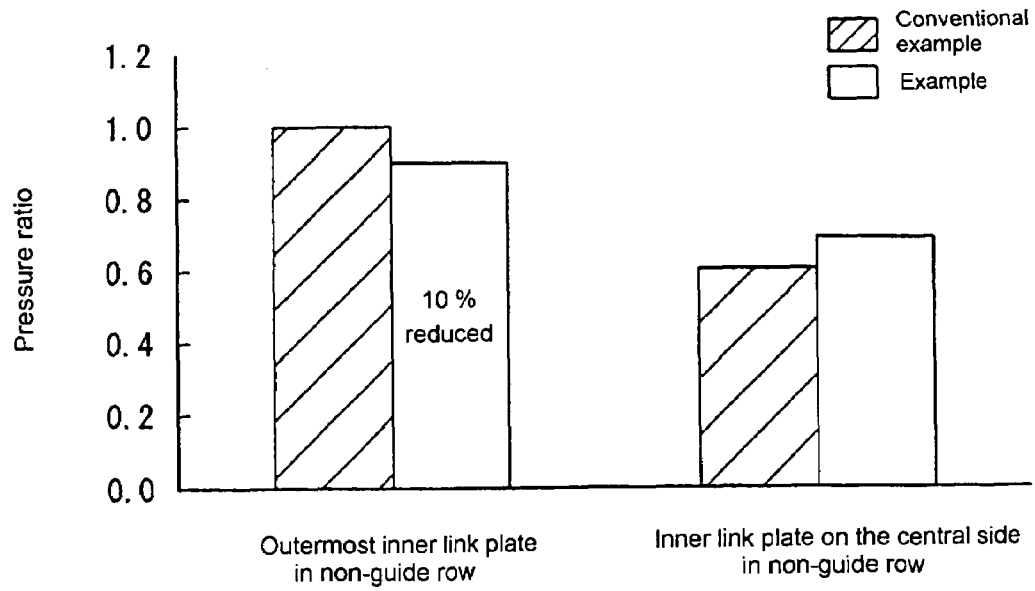
FIG. 7 is a graph showing the results of comparative test on the stresses exerted on inner link plates in the joint link rows of a conventional chain and a chain according to the invention.

FIG. 7 shows the results of tests of the stresses exerted on the individual link plates of the joint link (non-guide) rows JL of the conventional chain and the chain according to the invention. First, regarding the inner link plates 4a and 25a, which are positioned on the outsides of the joint link rows JL in the respective chains, the pressure ratio for the inner link plate 4a of the invention is reduced by 10% compared with the pressure ratio for the inner link plate 25a of the conventional chain. In the case of the intermediate inner link plates 4b and 25b in the joint link rows of the respective chains, the pressure ratio for the inner link plate 4b of the invention is slightly greater than that of the inner link plate 25b of the conventional chain. As a result, it will be seen from FIG. 7, that, in the case of the invention, the difference between the stress ratios for the outermost link plates and the intermediate link plates of the joint link row is reduced, and thus the balance of the stresses among the inner link plates of the joint link row is improved.

As seen in FIG. 1, in the silent chain according to the invention, although the total number of plates (5, 3a, 3b, 3c, 5) in a guide link row GL is five, and the total number of plates (4a, 4b, 4b, 4a) in a joint link row JL is four, there are only four areas where sliding contact occurs between the faces of adjoining plates, as compared with eight such areas in the conventional chain. As a result, friction loss is reduced in the silent chain according to the invention.

In the chain according to the invention, since the three inner link plates 3a, 3b and 3c of the guide link row GL are stacked and arranged centrally in the guide link row GL, and the inner link plates 4a and 4b are of the joint link row JL are stacked in pairs and disposed adjacent the guide plates 5 of the guide link row, stresses are exerted more uniformly on the link plates 4a and 4b of the joint link row JL. Flexure of the guide plates 5 and the connecting pins 6 is also suppressed, and, as a result, stress is distributed more uniformly among the inner link plates 3a, 3b and 3c of the guide link row GL, and the balance of stresses exerted on all the inner link plates 3a, 3b, 3c, 4a and 4b is improved.

When flexure of the guide plate 5 and the connecting pin 6 are suppressed, skewed contact of the connecting pins with the pin holes in the outermost link plates of the joint link rows is suppressed, and wear, due to contact between the pin and the pin hole over a limited area, is reduced. As a result, wear elongation of the chain is suppressed, problems resulting from elongation, such as generation of noise and tooth jumping are prevented, and, when the silent chain is used as a timing chain in an internal combustion engine, engine performance, and engine durability and reliability are also improved.

Further, since two stacked inner link plates 4a and 4b are provided on both sides of the joint link row JL, and disposed adjacent the guide plates 5 of the guide link rows, and three stacked inner link plates 3a, 3b and 3c, are provided in the central part of the guide link row GL, when the silent chain is flexed, the total contact area, where the plates slide against one another frictionally, is reduced by one-half, and friction loss is reduced accordingly. In this case, when the silent chain is used as the timing chain in an engine, engine fuel consumption is improved.

When an appropriate number of inner link plates having the same thickness are used in the guide link rows and the joint rows, it is unnecessary to provide plates of differing thicknesses. In that case, all the plates can have the same thickness, and manufacture and assembly of the silent chain can be carried out more easily.

Figure 5:
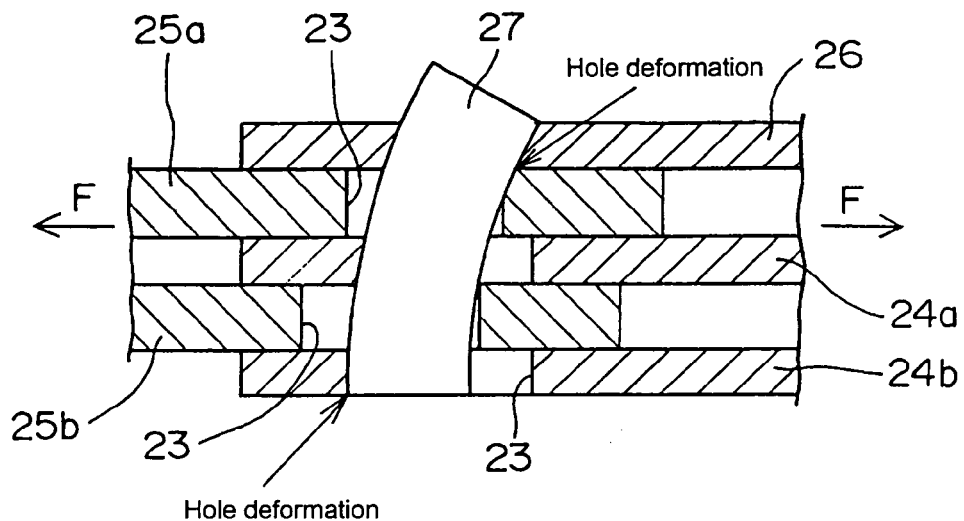
FIGS. 5(A) and 5(B) are schematic sectional views showing pin hole deformation due to wear, respectively in a conventional silent chain, and in a silent chain according to the invention.
Figure 5:
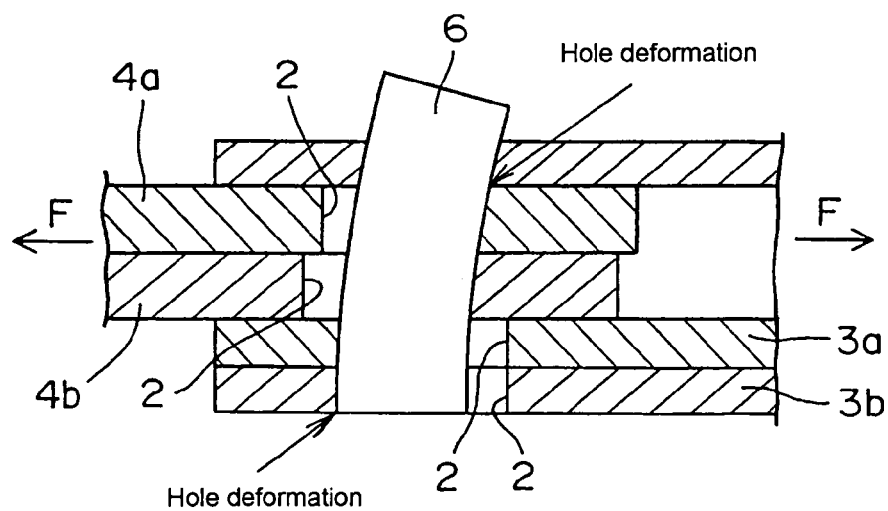

In the embodiment described above, three inner link plates are provided centrally in a stack in the guide link row. However, a larger number of stacked inner link plates may be used. Similarly, although the embodiment described has two inner link plates stacked together on each side of the joint row, more than two inner link plates may be used. Preferably, in order to achieve a good stress balance, the number of link plates in the joint link row should exceed the number of link plates in the guide link row by one plate. That is, if there are n link plates in the guide link row, there should be n+1 link plates in the joint link row. Further, in the preferred embodiment, as shown in FIG. 1, the inner link plates should all have the same thickness, and the guide plates may have the same thickness as the inner link plates. However, the thickness of the guide plates may be smaller than that of the inner link plates. Alternatively, as shown in FIGS. 4(B) and 5(B), the thickness of each inner link plate in the joint link row JL may be larger than that of each inner link plate in the guide link row G.

We claim:

1. A silent chain in which:
    a number of toothed link plates, each having a pair of teeth and a pair of pin holes, are respectively arranged in guide link rows and joint link rows with guide plates arranged on both outermost sides of each guide link row, and the guide link rows and the joint link rows are arranged alternately in an endless loop and connected to one another by connecting pins fitted into pin holes of said toothed link plates;
    in each guide link row, a central stack consisting of three toothed link plates in contact with one another is disposed at an intermediate location widthwise of the chain;
    in each joint link row, first and second stacks of toothed link plates, each stack consisting of two adjacent toothed link plates in contact with each other, are disposed in widthwise spaced relationship to each other;
    the first stack of toothed link plates of each joint row extends between the central stack of one adjacent guide link row and one of the guide plates thereof and in contact with said central stack and said one of the guide plates, and between the central stack of another adjacent guide link row and one of the guide plates of said another adjacent guide link row, and in contact with the central stack of said another adjacent guide link row and said one of the guide plates of said another adjacent guide link row;
    the second stack of toothed link plates of each joint row extends between the central stack of said one adjacent guide link row and the other one of the guide plates thereof and in contact with said central stack and said other one of the guide plates, and between the central stack of said another adjacent guide link row and the other one of the guide plates thereof, and in contact with said central stack of said another adjacent guide link row and said other one of the guide plates of said another adjacent guide link row;
    the number of toothed link plates in each joint row exceeds, by one link plate, the number of toothed link plates in each guide link row; and
    all of said toothed link plates have the same thickness.

2. A silent chain according to claim 1, in which each of the connecting pins of the chain is fixed to a pair of said guide plates on the outermost sides of a guide link row, and in which each of the toothed link plates of the chain is rotatable about each of the pins fitted into its pin holes.

* * * * *